Patented Apr. 8, 1930

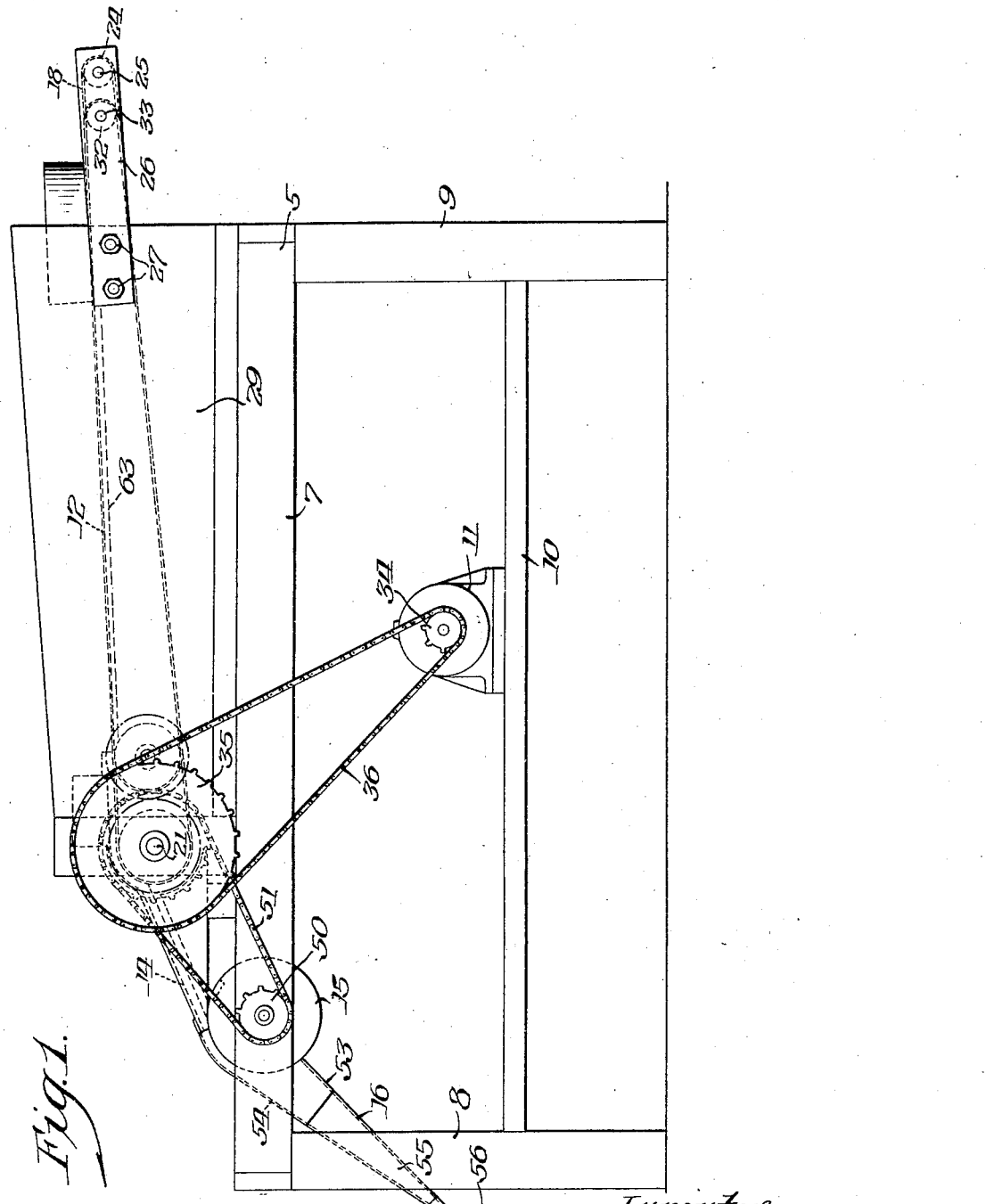

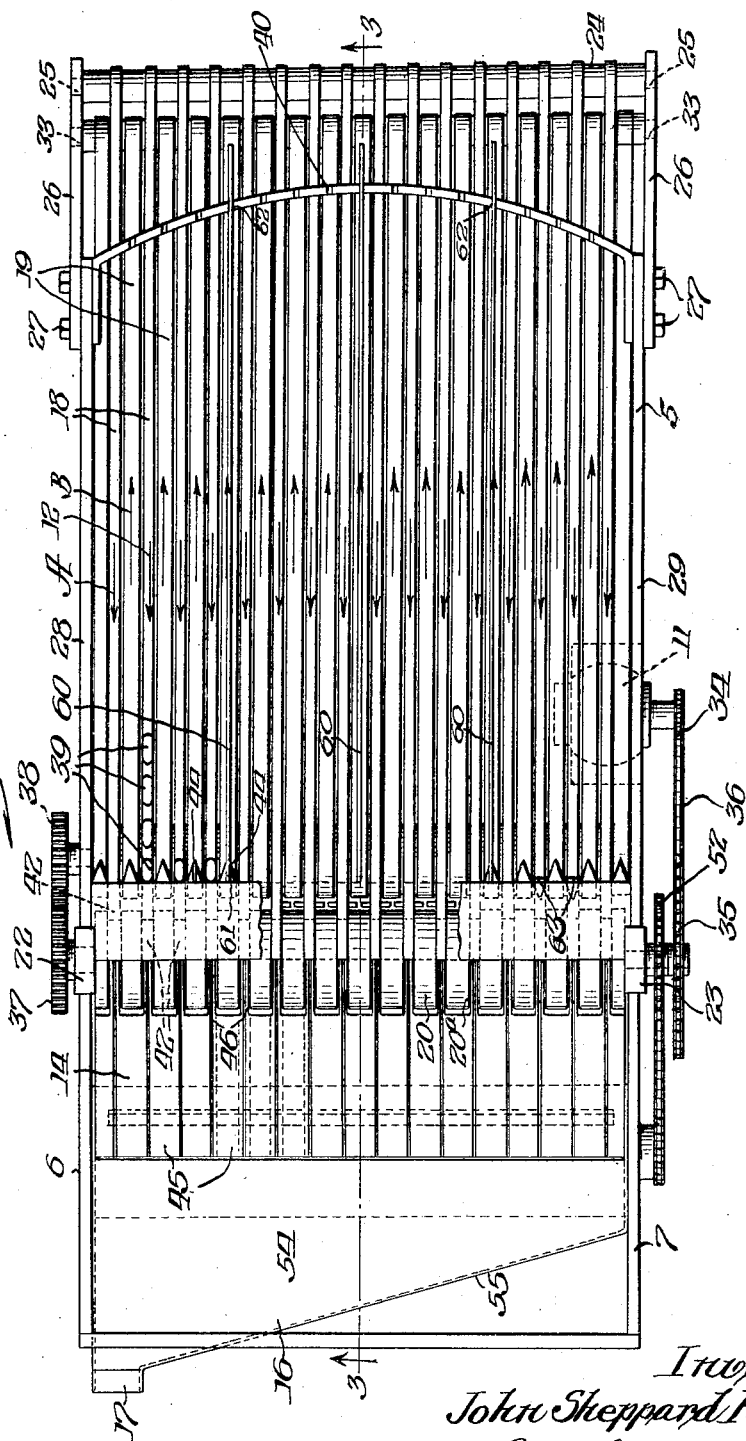

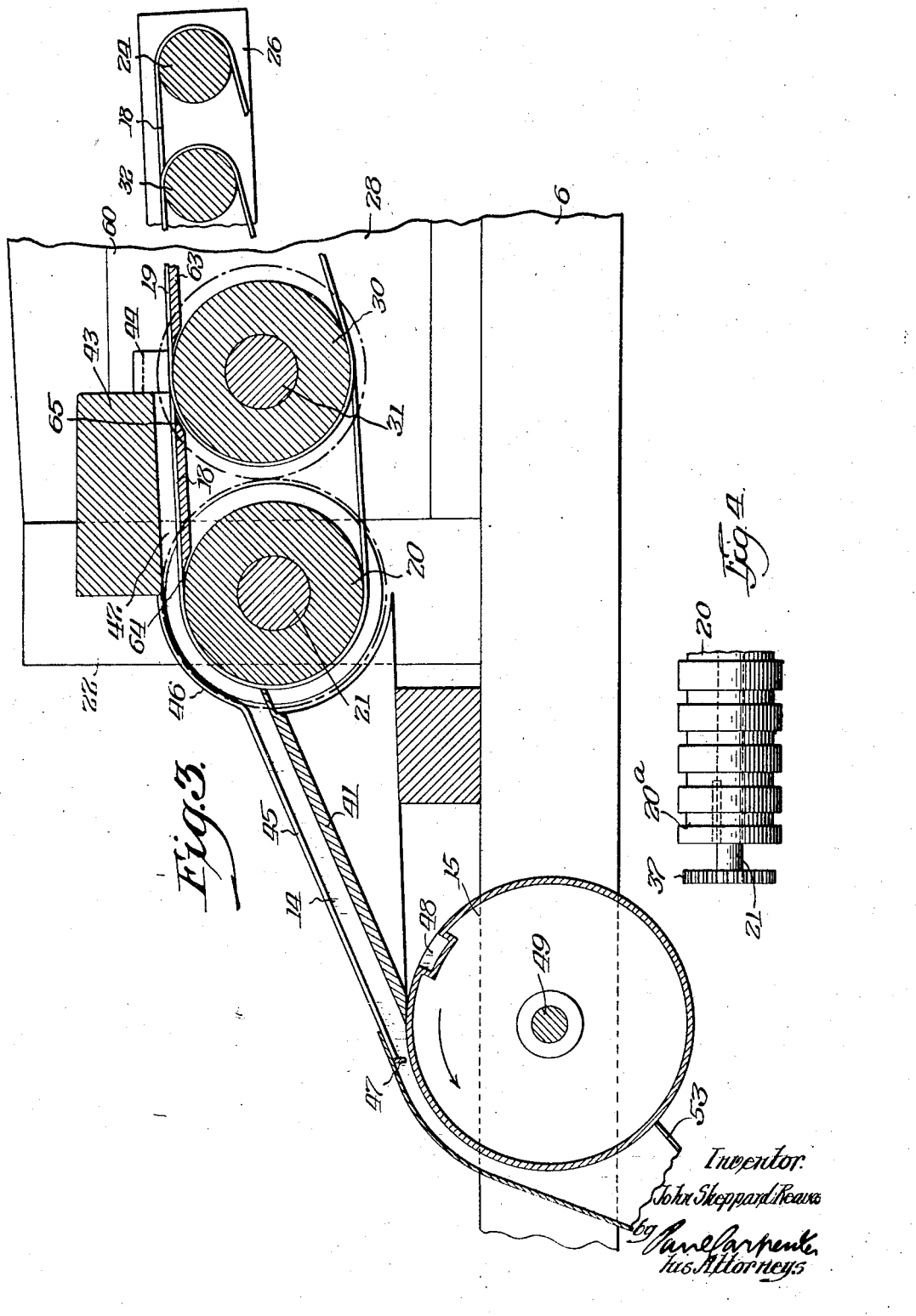

1,754,047

UNITED STATES PATENT OFFICE

JOHN SHEPPARD REAVES, OF PHILADELPHIA, PENNSYLVANIA

COUNTING AND GROUPING MACHINE

Application filed June 4, 1923, Serial No. 643,295. Renewed August 29, 1929.

This invention relates broadly to conveying apparatus, and more particularly pertains to conveying apparatus characterized by the embodiment therein of means for separating, aligning, grouping and counting out articles to be inserted in a package or carton held by any packaging machine, and to this end this invention includes certain features of construction which automatically carry out the steps of counting, grouping and discharging articles for packaging, which will be described in detail below.

While for purposes of convenience, this invention is illustrated as adapted for use in separating and conveying articles in selective groups of four articles each, with a total of sixteen to each motion of delivery, the device is intended for adaptation to deliver any desired number of groups or units to each group, or variables of each, and while food articles, such as candy tablets, are mentioned as the articles handled, the device may be adapted to the handling of other substances, and, therefore, this invention finds a wide field of utility for purposes other than as well as similar to that described.

The principal objects and advantages which characterize this invention reside in the provision of improved means for counting and grouping articles; the provision of improved means for counting, grouping and delivering articles; the provision of improved means for counting, aligning and grouping articles; the provision, in combination with a packaging machine, of means for counting, grouping and delivering articles to a carton or other container held by such machine; the provision of improved means for grouping and conveying articles; the provision of improved means for grouping, counting and delivering articles with retardation in two planes for changing the relationship of the articles in motion; the provision of improved separating and conveying means; the provision, in combination with a packaging machine, of improved means for counting and conveying articles; the provision of improved means for counting, grouping and delivering articles to a packaging machine which is adapted to hold a carton or container to receive the articles superposed therein or in layers; the provision of means for delivering articles for packaging in layers; the provision of means for delivering articles singly in succession from a series of groups; the provision of improved means for sorting and conveying a plurality of articles in a plurality of groups; the provision of improved means for sorting and conveying a plurality of articles in a plurality of groups and for delivering the articles of such groups singly in succession to a suitable container, without changing the relationship of the groups; the provision of improved means for counting and conveying articles in a plurality of groups, and then delivering the articles of each group singly in succession to a common point in such manner that the groups are maintained intact; the provision, in combination, of means for grouping and counting a plurality of articles, means for selecting one or more of the articles of each group in succession, and a receiver for such articles, arranged to simultaneously receive the articles of each group and deliver such articles in their grouped arrangement to a suitable container; and the provision, in combination with a packaging machine, of apparatus adapted to cooperate therewith whereby to deliver articles in superposed groups of desired number and of predetermined quantities each to a container held by said packaging machine.

This invention is further and more especially characterized by the provision, in combination, of means for counting out and grouping articles, and means for delivering such articles in alignment abreast and in groups; and means for altering the relationship of the articles while the group relationship is maintained substantially fixed; and the provision, in apparatus including such means, of delivery mechanism including the retardation of such elements in two planes at least, whereby to change the relationship of articles in the groups while the groups remain intact, permitting insertion of the articles in groups in succession or in a single column into a container; the provision of improved means for receiving a plurality of articles in bulk, sorting and counting them, and for delivering such articles in groups of a predetermined number and quantity simultaneously to a hopper, such hopper being characterized by the provision of means whereby the units of each group maintain their group relationship, but in which the relationship of the articles is changed, and then are delivered from the hopper in group layers to a suitable container carried by a packaging machine, the provision of an arrangement whereby the operator is enabled to pack articles in a predetermined grouped relationship, such as candy tablets in four groups of four tablets each in a single container, each group containing tablets of different flavors; the provision of an apparatus which includes means for synchronization with a packaging machine and operating to first select or count out and group a plurality of articles, then convey the groups simultaneously toward the point of discharge, and then handle the individual articles so that they are discharged in succession but in their respective groups into a container held by the packaging machine.

This invention further includes with other objects an improved method of handling articles prior to packaging, and the method includes the steps generally outlined above, a convenient structural arrangement for carrying out the method and for attaining the objects being illustrated in the accompanying drawings, in which:

Figure 1 is a side elevational view of a machine embodying the improvements of this invention;

Figure 2 is a top plan view;

Figure 3 is an enlarged fragmentary longitudinal vertical sectional view taken on the line 3—3 of Figure 2, and Figure 4 is a fragmentary elevational view of a detail.

As hereinabove explained, this invention involves an improved method or process of handling articles for packaging, which method generally includes the steps of counting and dividing the articles into groups and delivery in succession and in intact groups to a container or carton held by any packaging machine.

The method as here carried out involves deposition of the articles in bulk on conveyors which operate to select the articles and advance them in groups relatively abreast one another, then selection of a certain number of groups and delivery of the articles in each group in succession or in a single column to the container carried by the packaging machine, so that the articles as deposited in the container are in superposed relationship and yet arranged in the originally selected groups.

This invention has been designed to meet a requirement arising where it is desired to pack candy tablets of various flavors in a single container, and, as an example of the utility of the machine, it is assumed that it is desired to fill a container with say sixteen wafers or tablets arranged in the container in groups of four each in accordance with the flavor. In carrying out the method in this instance the tablets of the four flavors are divided into four groups of four tablets each and advanced at a uniform rate with the groups all abreast so that these sixteen tablets are delivered substantially simultaneously to a point where they are then moved in two planes in such manner that one tablet follows the other in a single file or column to a destination at which the tablets in their respective groups are deposited in succession in the container.

The method of selecting, conveying and transposing the articles mentioned is carried out by the structure illustrated, and referring now more particularly to the drawings, I provide a frame 5 composed of the side members 6 and 7 supported on suitable legs 8 and 9. A platform 10 is supported beneath the frame 5 on the legs 8 and 9 and an electric motor 11 or other source of power is affixed to said platform.

The apparatus for handling the articles to be counted and grouped includes a selecting conveyor generally designated 12, receiving channels generally designated 14, an ejection drum 15, and a hopper 16 provided with an outlet 17.

The conveyor 12 is composed of a plurality of alternately arranged endless belts 18—18 and 19—19, the alternate belts of each series 18 and 19 moving in opposite directions as indicated by the arrows A and B, Figure 2. The belts 19 are of greater width and travel at a slightly greater rate of speed than that of the belts 18 for a purpose which will hereinafter appear. The belts 18 are hereinafter termed feeding belts and the belts 19 are termed return belts.

All of the two series 18 and 19 are arranged with their upper flights in the same plane, the whole conveyor, as seen in Figure 1, being arranged in a slightly inclined plane from the right to the left hand end of the machine as viewed in Figure 1.

The belts 18 are trained over a driving roller 20, having spaced peripheral grooves 20ª, (see Figure 4) adapted to receive each one of the belts 18, said roller being fixed on a shaft 21, which is journalled in the standards 22 and 23, supported by the sides 6 and 7 of the frame 5, respectively, and said belts extend toward the receiving end of the machine, that is, the right hand end as viewed in Figure 1, and being trained over a smaller roller 24, revolubly mounted at 25 in the parallel extending brackets 26—26, secured by bolts 27 to the upstanding side partitions 28 and 29 mounted on the side members of the frame 5.

The belts of the series designated 19 are trained over a driving roller 30 fixedly mounted on a shaft 31 which is journalled in the partitions 28—29, as will be seen from an inspection of Figures 1 and 2, said belts 19 also being trained over a transverse roller 32, revolubly mounted at 33 in the brackets 26. It will be observed that the belts 19 are shorter than the belts 18, this being due to the fact that said belts 19 perform and complete their function before the articles reach the discharge ends of the belts 18, and, therefore, need not be coterminous with the belts 18.

Motion is transmitted from the motor 11 to the shaft 21 by the provision of a small sprocket 34 mounted on the shaft of the motor, a relatively large sprocket 35 fixed on the projecting end of the shaft 21, and a chain 36 which is trained over said sprockets 34 and 35. Rotation of the motor in a counter-clockwise direction will impart like motion to the shaft 21, and its roller 20, and as a consequence impart uniform movement to all of the belts 18 in the direction of the arrows A in Figure 2.

As previously explained, the conveyor belts 19 are adapted to move in an opposite direction to that of the belts 18 and at a slightly greater rate of speed, and to this end the rollers 20 and 30 are adapted to rotate in opposite directions and are directly connected for this purpose by the gears 37 and 38, the former being slightly greater in diameter than the latter, said gears being mounted on the projecting ends of the shafts 21 and 31, respectively.

It will be observed that the arrangement of the belts as described and their operation in opposite directions will function to cause articles which are deposited upon the belts to become aligned in tandem or succession on both sets of belts so that the belts 18—18 will function to carry each a single line of articles, as indicated at 39 in Figure 2. This is an important feature of this invention because, as will presently appear, it is highly desirable that the article be advanced evenly in alignment to their points of discharge. Should any of the articles conveyed on the belts 18 become disaligned the adjacent belts 19 running in the opposite direction will engage the article frictionally and thereby either realign it on its belt and permit it to continue on its journey through the machine, or return it to the starting point which should be adjacent the right hand end of the machine as viewed in Figures 1 and 2.

In order to prevent the articles returned on the belts 19—19 from leaving the machine and in order to cause such articles to be returned to the belts 18 the curved partition 40 is provided, forming a transverse baffle, which, due to its curvature, cooperates with the motion of the belts 19 to remove the returned articles from the return belts 19 and cause such articles to move over onto the belts 18. This baffle 40 also serves to cooperate with the belts to align the articles on the feeding belts 18. The baffle 40 is secured to the side partitions 28 and 29 mutually with the brackets 26 by means of the bolts 27.

Another feature of importance in connection with the belts resides in their difference in width, this arrangement assuring that the returning articles will not come in contact with the articles being fed as long as the latter are in proper alignment on their respective belts, it, therefore, being clear that the belts 18 should be substantially the same width as the article which is to be conveyed, and the belts 19, it follows, should be of greater width than that of the article when aligned on the return belt. It will be equally obvious that the shape of the article to be handled is rectangular or substantially so, and at least, that the article is longer than it is wide. There is no especial advantage in having the article longer than it is wide, but it is common practice to make candy tablets of such shape, and even in the case of other articles such as soap cakes, match boxes, cigarette boxes and the like, a similar shape is adhered to. Therefore, it will be seen that the belts as arranged, with variations in size, of course, will serve to handle many articles now placed on the market in cartons. The channels or tunnels 14 form an assembly which may be termed a separating or segregating device, that is, the channels 14 function to isolate each row of the articles as they leave the belts 18, and to this end the channels are arranged, as shown in Figure 3, on an inclined platen 41, having one end adjacent to the periphery of the belts 18 as it passes over the roller 20 and the other end substantially tangential to the periphery of the ejection drum 15.

The entrances to the channels 14 are arranged above the rollers 20 and 30 and such entrances are formed as grooves 42 in the underface of a bar 43 which extends transversely across the machine, above the belts 18 and 19 and is secured to the standards 22 and 23. The grooves 42, it will be readily understood, are in alignment with the channels 14, grooves 20ª, and with the feeding belts 18, and between adjacent channels, and in alignment with each of the belts 19, there are provided deflecting vanes 44—44, secured to or formed integral with the bar 43. The vanes 44 function so that should more than one article attempt to enter the respective channels at any instant, this will be corrected, or should there be a slight disalignment of the article upon reaching the entrances to the channel, the articles will be properly aligned. It will be observed, therefore, that it is impossible for two or more of the articles to become jammed in the entrances, because just as soon as an article turns transversely on the belt 18, it is either realigned on the belt or is returned by the belt 19 to the starting point. The rear portion of the bar 43 is undercut at 43ª to conform to the adjacent portions of the roller 20, and so that no space will intervene between the walls of the grooves 42 and the grooves 20ª.

For convenience in the operation of this machine the channels are covered by the removable panels 45—45, and said panels have their adjacent margins located approximately over the longitudinal axis of each of the channels 14. The panels 45 are provided with complemental arms 46—46, one on each margin of each panel, said arms being curved upwardly and lying within the confines of the grooves 20ª formed in the roller 20, but a sufficient distance above the belts 18 so as to avoid interference with the articles, but at the same time prevent their dislodgement from the channels by centrifugal force upon leaving the roller.

In order to prevent sagging of the belts forming the conveyor 12 and also prevent the articles from dropping down between the belts, I provide a table or platen 63 which underlies all of the belts and extends across the machine from a point substantially tangential to the roller 20 to a point ahead of the baffle 40, the platen 63 being provided with two series of openings 64 and 65 for accommodating the upper portions of the peripheries of the rollers 20 and 30.

The ejection roller 15 is adapted to receive and eject a plurality of the articles, one from each of the channels 14 upon each revolution of the drum.

To this end the articles travel down the inclined channels 14 and the lowermost article in each channel rests upon the periphery of the drum and is in engagement with the fixed abutment 47, there being one each of said abutments for each channel. The drum 15 is provided with a longitudinal elongated recess 48 extending beneath all of the channel outlets when the drum is rotated, so that as the recess passes beneath the channel outlet it receives a plurality of the articles, one from each channel. The drum 15 rotates in the direction of the arrow C in Figure 3 and said drum is fixedly mounted on a shaft 49 having a sprocket wheel 50 connected by a chain 51 to a driving sprocket wheel 52 fixedly mounted on the shaft 21.

It will be understood, of course, that more than one of the recesses 48 may be provided in the drum 15 where it is desired to speed up the rate of discharge of the article.

The drum will take one article from each channel and simultaneously deliver all of said articles to the hopper 16, and in the arrangement shown there will be sixteen articles deposited in the hopper each time that the drum 15 makes a revolution.

The hopper 16 is disposed in a generally inclined plane as best seen in Figure 1, and said hopper includes a bottom wall 53, a top wall 54, and a slanting front wall 55, the angularity of the walls 53 and 54 being such as to converge generally toward the outlet 17 which latter is approximately of a size just sufficient to admit discharge of one only of the articles at a time. Below the outlet 17 is disposed a carton 56 which may be supported and transported by any conventional form of packaging machine now well known in the art.

The function of the walls 53 and 55 is as follows: As the articles are simultaneously discharged onto the wall 53 from the recess 48 in the drum 15 they will, by gravity, slide down along the wall 53 and due to the frictional retardance there encountered the articles will abut the wall 55 in succession, and then, in a single file or column, slide along the wall 55 and discharge one at a time through the outlet 17. While the article discharged from the drum 15 at the bottom of Figure 2 has less distance to travel to the wall 55, its distance of travel to the outlet 17, as compared to the adjacent article, and the others simultaneously discharged, is greater and so on with all of the articles, so that while the articles are discharged simultaneously from the drum relatively abreast to one another they will issue from the outlet 17 in a single file or column and thus be deposited in the carton or container 56 one at a time in superposed relationship. Should the nature of the articles or their weight cause confusion in the hopper, the recess 48 may be slightly spiral or convolute and positioned so that the articles at the side of the machine toward the top of the Figure 2 will be discharged first, and the remaining articles in succession.

As previously explained, the device of this invention is adapted for packaging candy tablets in the present instance, and the tablets are packed with sixteen tablets to the carton, making four groups of four tablets each, each group being of a different flavor. For instance, one group of the tablets may be of lemon, the other of orange, and the others of any other flavor, usually of the citrus fruits.

In order to segregate the tablets of different flavor in grouping and aligning and delivering same the conveyor 12 may be divided into two or more, in the present instance, four substantially isolated sections, by the provision of the longitudinal partitions indicated at 60—60. This will allow for counting and delivery of four tablets for each of the groups assuming that the four well-known citrus flavors are employed, such as lime, orange, lemon and grape-fruit, and these tablets will be conveyed to the drum 15 and discharged into the hopper 16. It will also be obvious that any other combination of the fruit flavors may be had, such as cherry, grape, peach and raspberry.

It will be observed that the partitions 60 may be displaceable and reduced or increased in number so that where desired, in the present instance, as high as sixteen different flavors of the tablets fed to the hopper may be had and as low as two different flavors. It will be understood that the tablets of different flavors are deposited in the space between the partitions provided therefor and that the means for depositing the tablets may be any convenient arrangement of hoppers arranged above the machine near the receiving end thereof.

The partitions 60, for convenience, are removably mounted at their ends in slots 61 provided in the upper surfaces of the vanes 44 and complemental slots 62 in the upper edge of the baffle member 40. This flexible arrangement permits the operator to change the relationship of the groups, with respect to the number of tablets in each group without stopping the machine, the partitions 60 being readily lifted out of the grooves supporting same and moved to adjacent position. This, however, as a rule need not be followed out, because generally when packing the candy tablets a predetermined relationship of the groups with respect to number of tablets in each group and the number of groups is decided upon and adhered to.

As a further means for varying the numerical relationships of the group of articles, such as for dividing the conveyors into five groups of three articles each, one or more of the triangular blocks 63—63 may be inserted in the entrances to the channels, thus blocking off that particular channel. For instance, by closing off the channel at the lower part of Figure 2, and placing the partitions 60 in the proper positions, three groups of five articles each or five groups of three articles each may be delivered.

It will be understood that the description of the conveyance of the articles as abreast is intended to include any conveyance of the articles wherein they take two or more parallel tracks upon which they might advance, or wherein the articles advance in echelon.

From the foregoing it will be observed that an apparatus is provided whereby articles of the nature referred to and others of a similar nature may be counted, grouped and delivered in alignment for packaging purposes or for any other purposes in which such an apparatus finds utility, and that the arrangement of the partitions 60 is such that any desired numerical relationship of the group or the number of articles in the group, within the limits of the particular size of the machine involved, may be had without material structural alteration in the machine itself. The number of belts and their sizes may be varied depending upon the size and nature of the articles to be handled.

Having thus described my invention and illustrated its use, what I claim as new and desire to secure by Letters Patent is:—

1. In a device of the character described, in combination, a plurality of adjacent oppositely moving conveyors adapted to receive a plurality of articles to be delivered to a predetermined point, outlets for receiving said articles, and means for causing one article at a time to pass through each outlet.

2. In a device of the character described, in combination, a plurality of alternately arranged oppositely moving conveyors adapted to receive, align and convey in groups a plurality of streams of articles.

3. In a device of the character described, in combination, a plurality of oppositely moving conveyors, and means for dividing said conveyors into isolated groups.

4. In a device of the character described, in combination, means for selecting and conveying articles in groups arranged abreast, and means for delivering such articles in a single column of groups.

5. In combination with means for delivering a plurality of articles in single streams, means for dividing said streams into groups, means for simultaneously extracting one article from each stream, and means for interrupting one or more of said streams for varying the numerical relationship of the groups.

6. In a device of the character described, in combination, a plurality of independent conveying channels, and a plurality of oppositely moving conveyors complemental to said channels for separating and delivering articles seriatim to said channels.

7. In a device of the character described, in combination, a plurality of independent conveying channels, and a plurality of oppositely moving conveyors complemental to said channels for separating and delivering articles seriatim to said channels, and means for predetermining the number of said conveyors to be operative for delivering such articles.

8. In a device of the character described, in combination, a plurality of independent conveying channels, a plurality of oppositely moving conveyors complemental to said channels for separating and delivering articles seriatim to said channels, and means cooperating with said channels to finally determine the number of articles to be delivered by the conveyors and said last named means.

9. In a device of the character described, in combination, a plurality of independent conveying channels, a plurality of oppositely moving conveyors complemental to said channels for separating and delivering articles seriatim to said channels, and means for cooperating with said channels for removing therefrom a predetermined number of articles for deposit in a suitable container.

10. In a device of the character described, in combination, a plurality of independent conveying channels, a plurality of oppositely moving conveyors complemental to said channels for separating and delivering articles seriatim to said channels, and a drum having a channel adapted to determine and receive a number of articles from each channel from delivering a predetermined number of articles to a container.

11. The combination of a channeled magazine with spaced endless conveyors leading to each channel, oppositely moving endless conveyors interspaced with the first mentioned conveyors, and means guiding articles into said channels and mounted over the second mentioned conveyors and between the entrances to said channels.

12. The combination of a channelled magazine with spaced endless conveyors leading to each channel, oppositely moving endless conveyors interspaced with the first named conveyors and tapered abutments over the second named conveyors and between the entrances to the channels.

13. The combination of a channelled magazine with spaced endless conveyors leading to each channel, oppositely moving endless conveyors interspaced with the first named conveyors and tapered abutments over the second named conveyors and between the entrances to the channels, and an abutment over said conveyors remote from the magazine, the ends of the abutment being curved toward the magazine.

14. The combination of a channelled magazine with spaced endless conveyors leading to each channel, oppositely moving endless conveyors interspaced with the first named conveyors and tapered abutments over the second named conveyors and between the entrances to the channels, and grouping rails extending rearwardly from the magazine over the conveyors.

15. The combination of a plurality of spaced endless conveyors, a magazine having channels in communication with said conveyors, and a bar overlying said conveyors and provided with transverse grooves, complemental to said conveyors and channels.

16. The combination of a plurality of spaced endless conveyors, a roller over which said conveyors pass, an inclined magazine having channels in communication with said conveyors and substantially tangential to the periphery of said roller, and a bar overlying said conveyors and provided with transverse grooves, complemental to said conveyors and channels.

17. The combination of a plurality of spaced endless conveyors, a magazine having channels in communication with said conveyors, and a bar overlying said conveyors and provided with transverse grooves, complemental to said conveyors and channels, said channels having panels which are provided with curved portions overlying portions of said conveyors.

18. In a device of the character described, a plurality of alternately arranged endless conveyors having each a width conforming substantially to one dimension of an article to be conveyed thereby, and separating conveyors arranged between the first named conveyors for alining articles thereupon.

19. In a device of the character described, in combination, a plurality of alternately arranged oppositely moving conveyors, a receiving hopper and a discharging drum between the conveyors and said hopper.

20. In a device of the character described, in combination, a plurality of alternately arranged oppositely moving conveyors, a receiving hopper having plane surfaces angularly related, and a discharging drum between the conveyors and said hopper, one of said plane surfaces being angularly arranged across the discharge path for the said drum.

21. In a device of the character described, in combination, a plurality of arranged and aligning conveyors, means to arrange articles disposed on said aligning conveyors in substantial alignment transversely, traveling conveyors for simultaneously selecting one article from the first mentioned conveyors and means to convert and transpose the articles so selected in a single stream in the order of the arrangement of the articles in the conveyors first mentioned.

JOHN SHEPPARD REAVES.